(12) United States Patent
Abe et al.

(10) Patent No.: US 9,617,963 B2
(45) Date of Patent: Apr. 11, 2017

(54) FUEL INJECTION VALVE (71) Applicant: Hitachi Automotive Systems, Ltd., Hitachinaka-shi, Ibaraki (JP)

(72) Inventors: Motoyuki Abe, Tokyo (JP); Kiyotaka Ogura, Hitachinaka (JP); Eiji Ishii, Tokyo (JP); Tohru Ishikawa, Hitachinaka (JP); Masahiro Soma, Hitachinaka (JP); Hideharu Ehara, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/765,438

(22) PCT Filed: Jan. 24, 2014

(86) PCT No.: PCT/JP2014/051438
§ 371 (c)(1),
(2) Date: Aug. 3, 2015

(87) PCT Pub. No.: WO2014/119472
PCT Pub. Date: Aug. 7, 2014

(65) Prior Publication Data
US 2015/0377200 A1 Dec. 31, 2015

(30) Foreign Application Priority Data
Feb. 4, 2013 (JP) ................................. 2013-019061

(51) Int. Cl.
*F02M 61/00* (2006.01)
*F02M 61/04* (2006.01)
(Continued)

(52) U.S. Cl.
CPC ........... *F02M 61/045* (2013.01); *F02B 23/08* (2013.01); *F02M 51/0671* (2013.01);
(Continued)

(58) Field of Classification Search
CPC ........... F02M 51/0671; F02M 61/1826; F02M 61/168; F02M 61/1853; F02M 61/1813
(Continued)

(56) References Cited

U.S. PATENT DOCUMENTS 4,540,126 A     9/1985   Yoneda et al.
4,971,254 A * 11/1990   Daly .................... F02M 51/061
                                                            239/396
(Continued)

FOREIGN PATENT DOCUMENTS

JP         59-22984 U     2/1984
JP       2000-345944 A   12/2000
(Continued)

OTHER PUBLICATIONS

International Search Report (PCT/ISA/210) dated Mar. 11, 2014, with partial English translation (five (5) pages).

*Primary Examiner* — Davis Hwu
(74) *Attorney, Agent, or Firm* — Crowell & Moring LLP (57) ABSTRACT

In a fuel injection valve, it is possible to obtain spray in which the penetrating force of injected fuel is suppressed. The fuel injection valve includes a valve seat that forms a gap with a valve body, the gap allowing fuel to pass therethrough, and multiple injection holes that are located further downstream from the gap. The fuel to which pressure is applied flows out from the injection holes.

When the flow velocity of the fuel in the gap formed between the valve body and the valve seat is indicated by meters per second, the flow velocity is set to be greater than a value obtained by multiplying the square root of the pressure applied to the fuel by 28. In this manner, the flow velocity in the gap increases, and flow velocity distribution inside the injection hole is uniformized, thereby suppressing an increase in penetration.

6 Claims, 5 Drawing Sheets

(51) Int. Cl.
  *F02M 61/18*   (2006.01)
  *F02M 51/06*   (2006.01)
  *F02B 23/08*   (2006.01)
  *F02M 63/00*   (2006.01)
  *F02B 75/12*   (2006.01)

(52) U.S. Cl.
  CPC .......... *F02M 61/18* (2013.01); *F02M 61/184* (2013.01); *F02M 61/1813* (2013.01); *F02M 61/1833* (2013.01); *F02M 61/1846* (2013.01); *F02M 61/1886* (2013.01); *F02M 61/1893* (2013.01); *F02M 63/0017* (2013.01); *F02M 63/0077* (2013.01); F02B 2075/125 (2013.01); *Y02T 10/123* (2013.01); *Y02T 10/125* (2013.01)

(58) Field of Classification Search
  USPC ................. 239/533.12, 533.2, 584, 585.5
  See application file for complete search history.

(56) References Cited

U.S. PATENT DOCUMENTS

| | | | |
|---|---|---|---|
| 6,499,467 B1 * | 12/2002 | Morris | F02M 47/027 123/446 |
| 2008/0135014 A1 | 6/2008 | Blessing et al. | |
| 2010/0320293 A1 | 12/2010 | Ogura et al. | |

FOREIGN PATENT DOCUMENTS

| | | | |
|---|---|---|---|
| JP | 2001-182641 A | 7/2001 |
| JP | 2003-184706 A | 7/2003 |
| JP | 2008-121578 A | 5/2008 |
| JP | 2009-513856 A | 4/2009 |
| JP | 2011-1864 A | 1/2011 |

\* cited by examiner

FUEL INJECTION VALVE

TECHNICAL FIELD

The present invention relates to a fuel injection valve used in an internal combustion engine, which is an electromagnetic fuel injection valve in which the injection valve is opened and closed by an electromagnetic force.

BACKGROUND ART

The present invention particularly relates to a fuel injection valve used in an engine (direct injection engine) which employs a method of directly injecting fuel into a combustion chamber, among spark ignition-type internal combustion engines (gasoline engine) in which the internal combustion engines use gasoline as fuel.

In some cases, the fuel of the gasoline engine cannot be ignited when an air-fuel ratio representing a mixture ratio between air and fuel is too high or too low. In addition, if the air-fuel ratio of the air-fuel mixture is higher or lower than a theoretical air-fuel ratio, the air is oversupplied or the fuel is oversupplied. Consequently, nitrogen oxide is generated, or an unburnt fuel component (HC) is generated in some cases. Therefore, a fuel injection amount is adjusted so as to inject the fuel whose amount allows the air-fuel ratio to reach a predetermined value, thereby supplying the fuel to the combustion chamber.

In the direct injection engine, a fuel injection hole of a fuel injection valve is installed so as to be directly exposed to the combustion chamber of the engine. The fuel is sprayed and directly injected into the combustion chamber by the fuel injection valve. Timing for injecting the fuel generally falls in a range from an intake stroke to a compression stroke. Within this range, the fuel is mixed with the air so as to form the air-fuel mixture. A general port-injection engine employs a method of igniting the fuel after injecting the fuel into an intake port during an exhaust stroke and subsequently taking the air fuel mixture into the combustion chamber during the intake stroke. In contrast, the direct injection engine is different from the port-injection engine in that a time period from injection until the air-fuel mixture is formed is short and the injection destination is the combustion chamber.

For this reason, in a case of the air-fuel mixture formed inside the combustion chamber of the direct injection engine, a concentration difference occurs locally in fuel concentration, and thus the concentration difference in the fuel concentration often causes nitrogen oxide or an unburnt fuel component to be generated.

In particular, if the fuel directly injected into the combustion chamber reaches and adheres to combustion chamber wall surfaces such as a piston crown surface, a cylinder wall surface, and an engine head wall surface, or a valve, the fuel concentration locally becomes higher in the vicinity of the wall surface, thereby causing the unburnt fuel component (HC) to be generated. Otherwise, in a state of insufficient oxygen, the unburnt fuel component is degenerated into soot, thereby causing the soot to be discharged therefrom.

In order to cope with this problem, it is necessary to adjust a spray shape to fit an injection point, of the fuel and a shape of the combustion chamber so that the fuel spray is less likely to collide with the valve or the combustion chamber wall surfaces. Therefore, the spray shape of the direct injection gasoline engine needs to be very freely designed. In order to very freely design the spray shape, a multi-hole nozzle is advantageously employed which has multiple holes for forming the spray and which can set each injection direction of the holes to be oriented in a desired direction.

In addition, a factor of increasing the possibility that the fuel spray may adhere to the combustion chamber wall surfaces as described above includes a great penetrating force (penetration) of the fuel spray injected from the fuel injection valve. The spray of great penetration disadvantageously reaches a position far from the injection point within a short period of time. For this reason, in some cases, the spray of great penetration disadvantageously reaches and adheres to the combustion chamber wall surfaces before the fuel is sufficiently mixed with the air after the injection.

A method disclosed in PTL 1 is one of methods for coping with this problem. PTL 1 discloses a method for attenuating the penetration by decreasing the flow velocity of the fuel to be injected.

CITATION LIST

Patent Literature
PTL 1: JP-A-2000-345944

SUMMARY OF INVENTION

Technical Problem

According to the method disclosed in PTL 1, the volume of a fuel passage located further downstream from a gap between a valve body and a valve seat is large. Thus, there is a possibility that the fuel metered by opening and closing instances of the valve may not be partially injected into the combustion chamber and a substantial amount of the fuel may remain in a portion corresponding to the volume of the fuel passage located downstream. If a lot of the fuel remains, the remaining fuel is evaporated while being exposed to high temperatures during the combustion stroke (expansion stroke). Consequently, a lack of air in the surroundings causes the fuel to be discharged as the unburnt fuel component. Otherwise, the unburnt fuel remaining thereinside becomes hot, and the molecular weight increases, thereby causing a possibility that the unburnt fuel is likely to remain thereinside as sooty solids.

Solution to Problem

The present invention has been made in consideration of the above-described problem, and a fuel injection valve includes a valve seat that forms a gap with a valve body, the gap allowing fuel to pass therethrough, and multiple injection holes that are located further downstream from the gap, wherein fuel to which pressure is applied flows out from the injection holes, and wherein flow velocity of the fuel in the gab formed between the valve seat and the valve body is set to be greater than a value obtained by multiplying the square root of the pressure applied to the fuel by 28.

Advantageous Effects of Invention

It is possible to obtain an injection nozzle whose spray penetration is short.

DESCRIPTION OF EMBODIMENTS

[Embodiment 1]

Figure 1:
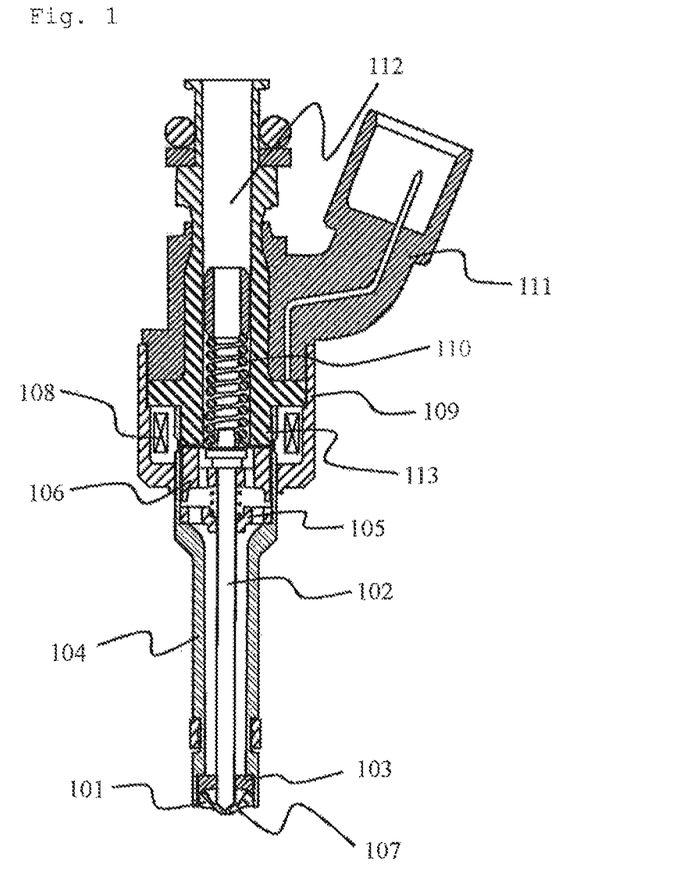
FIG. 1 is a sectional view illustrating a first embodiment of a fuel injection valve according to the present invention.

FIG. 1 is a sectional view illustrating an example of a fuel injection valve according to the present invention. An electromagnetic fuel injection valve illustrated in FIG. 1 is an ON/OFF valve which controls injecting and stopping of fuel by causing a valve body 102 to vertically move so as to open and close a gap with a valve seat 101.

In a state where power is not supplied to a coil 103, the valve body 102 is biased in a direction toward the valve seat 101 by a biasing spring 104, thereby bringing a valve into a closed state. If the power starts to be supplied to the coil 103, a magnetic attraction force is generated between a magnetic core 113 and a movable element 106, and the movable element 106 together with the valve body 102 are displaced in a direction toward the magnetic core 113, thereby opening the valve. At this time, a gap is generated between the valve seat 101 and the valve body 102. Fuel passes through this gap, reaches an injection hole 107, and is injected from the injection hole 107.

Figure 2:
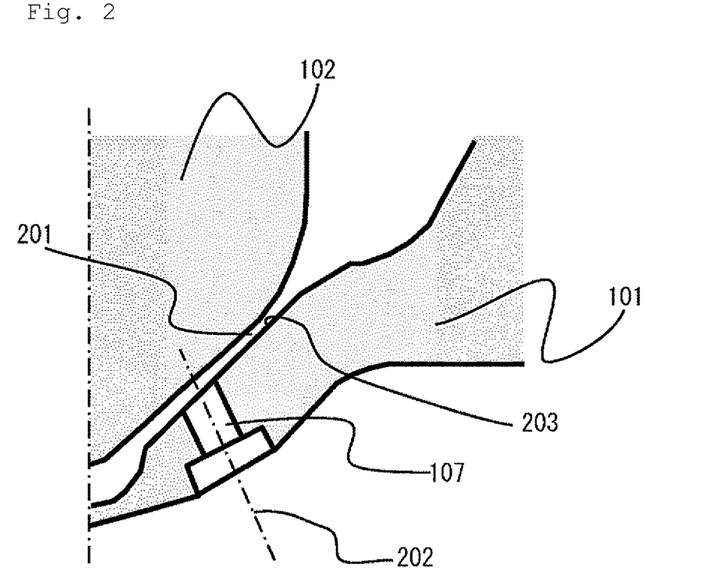
FIG. 2 is a sectional view of the fuel injection valve according to the present invention, and is an enlarged view illustrating the vicinity of a movable element in a closed valve state.

FIG. 2 is a sectional view of an injection nozzle which is obtained by enlarging the vicinity of the injection hole 107 of the fuel injection valve according to the present invention. In the injection nozzle of the fuel injection valve illustrated in FIG. 2, the valve body 102 is formed so as to have a partially spherical surface, and the valve seat 101 is formed so as to have a conical shape. In a state where the valve is closed (closed valve state), the valve body 102 is adapted to come into contact with the valve seat 101 in a seat portion 201. In the seat portion 201, when the valve is brought into an open state, a distance made between a seat surface 203 and a surface of the valve body 102 is set to be narrowest. In a state where the valve is open (open valve state), an area of a flow path in the seat portion 201 is adapted to be smallest on the immediately upstream side and the immediately downstream side of the seat portion 201. Accordingly, flow velocity or the fuel in the seat portion 201 is adapted to be fastest in a range of the immediately upstream side and the immediately downstream side. The flow velocity is seat portion flow velocity.

The fuel flows into the injection hole 107 after the flow velocity thereof becomes faster in the seat portion 201. The fuel flowing into the injection hole 107 is injected outward from the injection hole 107 while having a component of the flow velocity in a direction of an axis 202 of the injection hole (flow velocity in the axial direction) and a component of the flow velocity in a direction perpendicular to the axis 202 of the injection hole (flow velocity in the spreading direction) inside the injection hole 107.

The injected fuel is sprayed in a mist state, and moves forward while being spread. Here, penetration can be defined as a reachable distance of the spray after a certain period of time. If the penetration is measured, it is possible to know whether the spray is likely to reach a far distance or whether the spray is likely to stay within a short distance.

Spray penetration is significantly influenced by the initial velocity when the fuel is injected from the injection hole and from air resistance received by a droplet after being injected. The initial velocity at the time of injection is a main factor for determining the penetration, and flow velocity in the axial direction of the injection hole corresponds to this initial velocity. In order to shorten the penetration, it is necessary to decrease the initial velocity.

In addition, the air resistance received by the droplet is also a factor which affects penetration. The air resistance receives an influence from spray spreading. If the spray is injected while being spread, the distance between the droplets in the mist is spread, a certain droplet is less likely to be influenced by the air flow formed by an adjacent droplet. The air flow formed by an adjacent droplet has a velocity which is close to the velocity of the certain droplet itself. Accordingly, as much as the certain droplet is influenced by the air flow formed by the adjacent droplet, the relative velocities of the droplet and the air decreases. Consequently, air resistance decreases. On the other hand, if the influence from the air flow formed by the adjacent droplet is small, air resistance tends to increase. For this reason, if the spray is spread and the distance between the droplets are far, the air resistance received by the droplet is likely to increase. Therefore, penetration is likely to be shortened. In order to obtain a shorter penetration by spreading the mist, the flow velocity in the spreading direction inside the injection hole may be increased.

As described above, in order to obtain shorter penetration, an effective way is to decrease the flow velocity in the axial direction and to increase the flow velocity in the spreading direction.

According to the present invention, in order to achieve both the decreased flow velocity in the axial direction and the increased flow velocity in the spreading direction, a configuration of increasing the flow velocity in the seat portion 201 is adopted. If the flow velocity in the seat portion 201 increases, pressure loss in the seat portion 201 increases. Consequently, an injection amount (static flow) per unit time of the injection valve is reduced, if there is no change. Therefore, in order to obtain a predetermined static flow, a total sectional area of the injection hole 107 is increased in accordance with a design value of the flow velocity in the seat portion 201. A general porous fuel injection valve has multiple injection holes. Accordingly, it is preferable to design the fuel injection valve so that the total sectional area of these injection holes increase.

When an area of the fuel passage in a gap portion formed between the seat surface 203 and a surface of the valve body 102 is set to A ($m^3$), flow velocity (unit: m/s) in the seat portion can be calculated by dividing static flow Q ($m^3$/s) by A ($m^3$). In addition, when the seat surface 203 has a conical surface shape and the surface and the surface of the valve body 102 come into contact with each other so as to open and close the valve, seat portion flow velocity v can be calculated as expressed in Equation (1) below by using an apex angle θ (°) of the conical surface (seat angle), a lifting amount Y (m) of the valve, and a circle diameter Ds (m) (seat diameter) formed by a contact position between the seat surface 203 and the valve body 102.

$$v = Q / \{Ds \cdot Y \cdot \pi \cdot \sin(\theta/2)\} \tag{1}$$

When the seat surface is not the conical surface as described in the present embodiment, this relationship can be calculated by using an expression in which twice the amount of the angle formed between a surface which is in contact with a contact portion of the valve body 102 and an axis of the injection valve is set to θ. In addition, if there are multiple circles in the contact portion between the valve body 102 and the at surface 203, or if the circle is wide, the value of the smallest circle is used. In this manner, it is possible to evaluate the area value of the flow velocity generated in the seat portion.

If the flow velocity calculated in this manner is fast in the seat portion 201 and the sectional area of the injection hole 107 is large, it is possible to decrease average flow velocity in the axial direction in the injection hole 107 which can be evaluated by a value in which the static flow is divided by the total sectional area of the injection holes. The average flow velocity in the axial direction represents the initial velocity of injected fuel. Accordingly, if the average flow velocity in the axial direction decreases, it is possible to obtain shorter penetration.

Figure 3A:
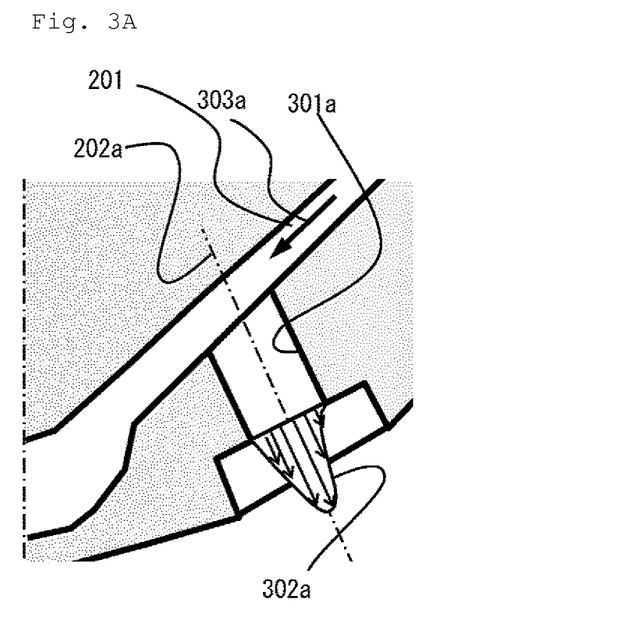
FIG. 3A is a sectional view of the fuel injection valve according to the present invention, and is an enlarged view illustrating the vicinity of the movable element in an open valve state when flow velocity is slow.

In addition, if the flow velocity is fast in the seat portion 201 as described above and the initial injection velocity is slow at an outlet of the injection hole 107, the fuel flows from the seat portion 201 toward the injection hole 107 while the flow is decelerated. That is, the flow velocity in the injection hole 107 is in a slower state than the flow velocity in the seat portion 201. In general, decelerated flow is likely to become unstable. Therefore, the flow in the injection hole 107 is likely to hold many disturbance components due to the decelerated flow, and due to these disturbance components, flow velocity distribution inside the injection hole is likely to become uniform. That is, as illustrated by flow velocity distribution in FIG. 3(b), in a case of flow velocity distribution 302b of the flow velocity in the axial direction of the injection hole at a position from an injection hole inner wall surface 301b to an injection hole central axis 202b, a gradient thereof is likely to become steep in the vicinity of the injection hole inner wall surface 301b, and the gradient is likely to become smooth around the injection hole central axis 202b, FIG. 3(a) illustrates an example of a case where flow velocity 303a is slow in the seat portion 201. As compared to FIG. 3(b) illustrating a case where flow velocity 303b is fast in the seat portion 201, flow velocity distribution 302a is likely to become uneven flow velocity distribution in which the gradient is smooth in the vicinity of an injection hole inner wall 301a and the maximum flow velocity is fast.

Figure 3B:
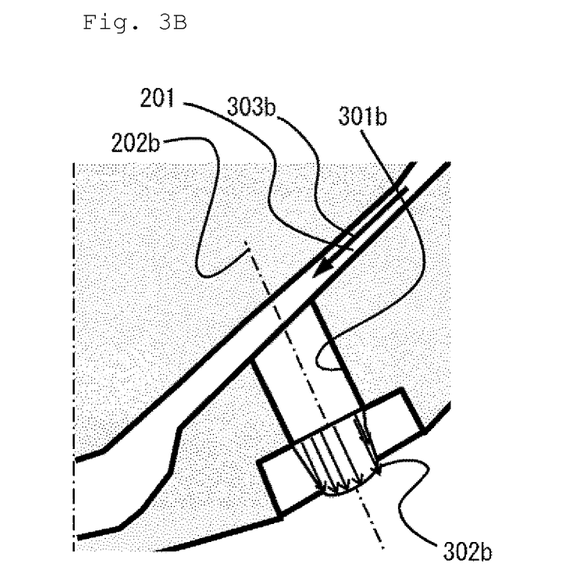
FIG. 3B is a sectional view of the fuel injection valve according to the present invention, and is an enlarged view illustrating the vicinity of the movable element in the open valve state when flow velocity is fast.

In a case of the flow velocity distribution which is smoothed as illustrated in FIG. 3(b), a difference between the fast flow velocity and the slow flow velocity decreases. Accordingly, when the flow rate per unit time is constant from the injection hole, as compared to a case where the flow velocity distribution is not smoothed, it is possible to obtain an advantageous effect of decreasing a portion of the fast flow velocity, or decreasing the maximum value of the flow velocity. If the region of the fast flow velocity is large or the maximum value of the flow velocity is great in the flow velocity distribution inside the injection hole, the penetration may be caused to increase. That is, if the smoothed flow velocity distribution is obtained in which the region of the fast flow velocity or the maximum value of the flow velocity can be smaller, the penetration can be shortened. As described above, according to the present invention, the flow velocity distribution inside the injection hole is smoothed by increasing the seat portion flow velocity, thereby shortening the penetration.

In addition, a flow velocity vector in the seat portion 201 is oriented in a direction which is different from the axial direction of the injection hole. Therefore, if the flow velocity in the seat portion 201 increases, there is an advantageous effect in that flow velocity of the component at the inlet portion of the injection hole 107 increases in the direction which is different from the direction of axes 202a and 202b of the injection hole, that is, a flow velocity component increases in the spreading direction. The injected fuel is dispersed and the distance between the sprayed droplets is increased by increasing the flow velocity component in the spreading direction. Therefore, atmospheric gas increases resistance, thereby suppressing the penetration.

It is considered that the flow velocity of the fuel flowing into the injection hole inevitably loses the flow velocity component in the spreading direction while being rectified inside the injection hole. However, if the fuel flows into the injection hole in a state of having sufficient flow velocity component in the spreading direction, the fuel is allowed to flow out while maintaining the flow velocity component in the spreading direction.

In particular, the disturbance component more actively increases in the injection hole 107 due to the above described decelerated flow velocity, and the flow velocity component in the spreading direction at the outlet of the injection hole 107 is further promoted by the flow being changed to turbulent flow at the inlet portion of the injection hole 107.

Figure 6:
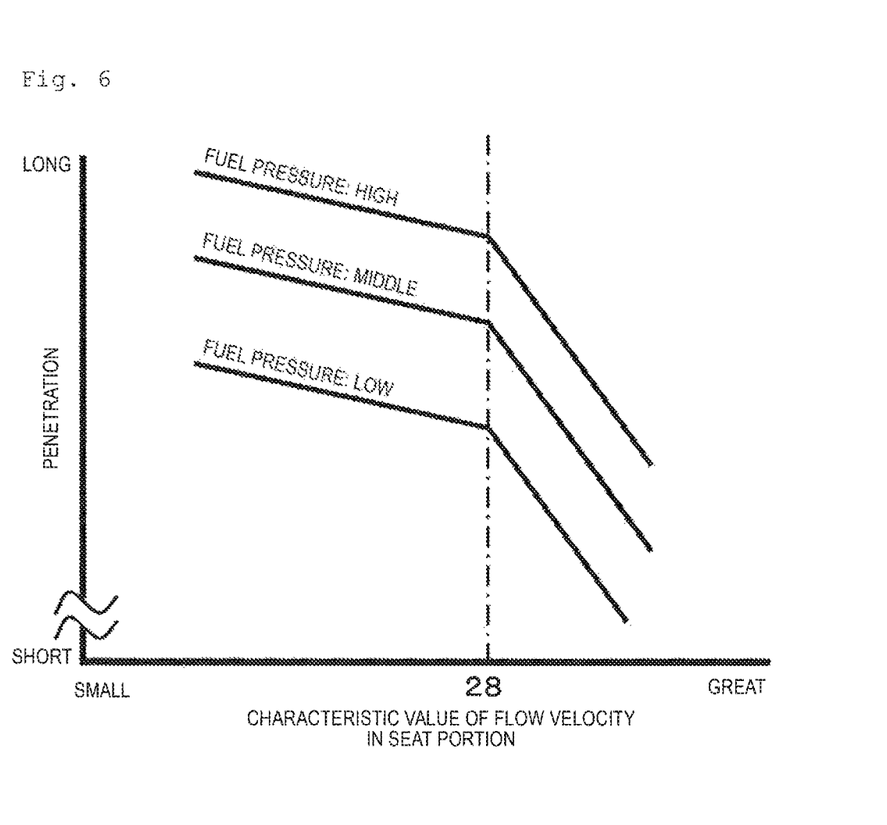
FIG. 6 is a graph illustrating a relationship between flow velocity and penetration in a seat portion.

That is, if the flow is changed to the turbulent flow at the inlet of the injection hole, the disturbance component increases inside the injection hole 107, and the flow velocity distribution is smoothed, thereby decreasing the maximum flow velocity. In addition, the disturbance component at the outlet of the injection hole which is generated by the flow changing to the turbulent flow increases the flow velocity component in the spreading direction, As a result, a relationship between the flow velocity in the seat portion 201 and the penetration is as illustrated in FIG. 6. In particular, a region where the penetration is rapidly shortened appears in a region where the flow velocity is fast. The horizontal axis represents a normalized value obtained by dividing the flow velocity in the seat portion 201 by the square root of the fuel pressure (characteristic value of the seat portion flow velocity), and the vertical axis represents the penetration in case of certain fuel pressure. As illustrated in FIG. 6, if the characteristic value of the seat portion flow velocity exceeds 28, the penetration rapidly decreases regardless of the fuel pressure.

That is, when the flow velocity of the fuel in the gap of the seat portion 201 is indicated in meters per second, the flow velocity is set to be greater than a value obtained by multiplying the square root of the fuel pressure by 28. In this manner, it is possible to obtain a nozzle whose penetration is shorter.

As described above, in order to increase the flow velocity in the seat portion 201, a sectional area A serving as a fluid passage of the seat portion 201 may be set to be smaller. The sectional area A is the denominator appearing in Equation (1), and is expressed by Equation (2).

$$A = Ds \cdot Y \cdot \pi \cdot \sin(\theta/2) \tag{2}$$

That is, it is possible to increase the flow velocity in the seat portion 201 by decreasing the maximum lifting amount Y of the valve body 102, by decreasing the seat diameter Ds, or by decreasing the seat angle θ.

The power loss increases in the seat portion 201 by only decreasing the gap of the seat portion 201 in this way. Consequently, in some cases, it is not possible to obtain a desired injection amount (static flow) per unit time.

As described above, in order to obtain desired static flow even when the flow velocity is caused to increase in the seat portion 201, an effective way is to set the injection hole 107 so that the pressure loss decreases in the injection hole 107.

Figure 4:
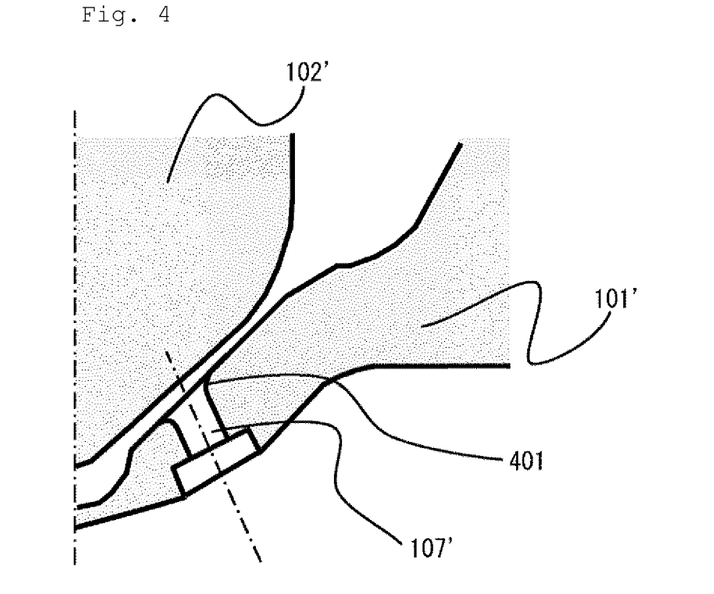
FIG. 4 is a schematic view illustrating a valve operation of the fuel injection valve according to the present invention.

For example, in order to decrease the power loss in the injection hole 107 and in order to obtain desired static flow, an effective way is to provide an R-shape 401 for an inlet portion of an injection hole 107' as illustrated in FIG. 4. The R-shape 401 at the inlet portion of the injection hole 107' as illustrated in FIG. 4 suppresses separation of the flow at the inlet of the injection hole 107', and an effective sectional area of the injection hole is widened, thereby decreasing the power loss in the injection hole. As a result, even if the flow velocity in the seat portion 201 is set to be faster, it becomes possible to obtain desired static flow. In addition, an effect of causing the inlet R of the injection hole 107' to suppress the separation of the flow improves uniformity in the flow inside the injection hole 107', and thus it is possible to decrease the maximum flow velocity. Therefore, it is an effective way to shorten the penetration. Furthermore, the improved uniformity in the flow velocity inside the injection hole 107' which is achieved by suppressing the separation of the flow reduces the fuel to be discharged while the flow velocity of the fuel is slow. Accordingly, it is possible to prevent the fuel, whose flow velocity is slow from forming coarse particles. Therefore, it is also possible to obtain an improved micronizing effect for the fuel.

Alternatively, the diameter of the injection hole 107 may be set to be larger. Even when the diameter of the injection hole 107 is set to be larger, it is possible to suppress the power loss in the injection hole 107. Even in a case of accelerating the flow velocity in the seat portion 201, desired static flow is likely to be obtained. In particular, the total sectional area of the injection hole 107 may be set to be larger than a fuel passage sectional area A (refer to Equation (2)) in the seat portion 201. In a case where the fuel passage sectional area is set in this way, the flow from the seat portion 201 toward the injection hole 107 is decelerated. Not only the flow is likely to be changed to the turbulent flow, but also the average flow velocity itself in the injection hole 107 can be decelerated. Therefore, it becomes possible to shorten the penetration.

Figure 5:
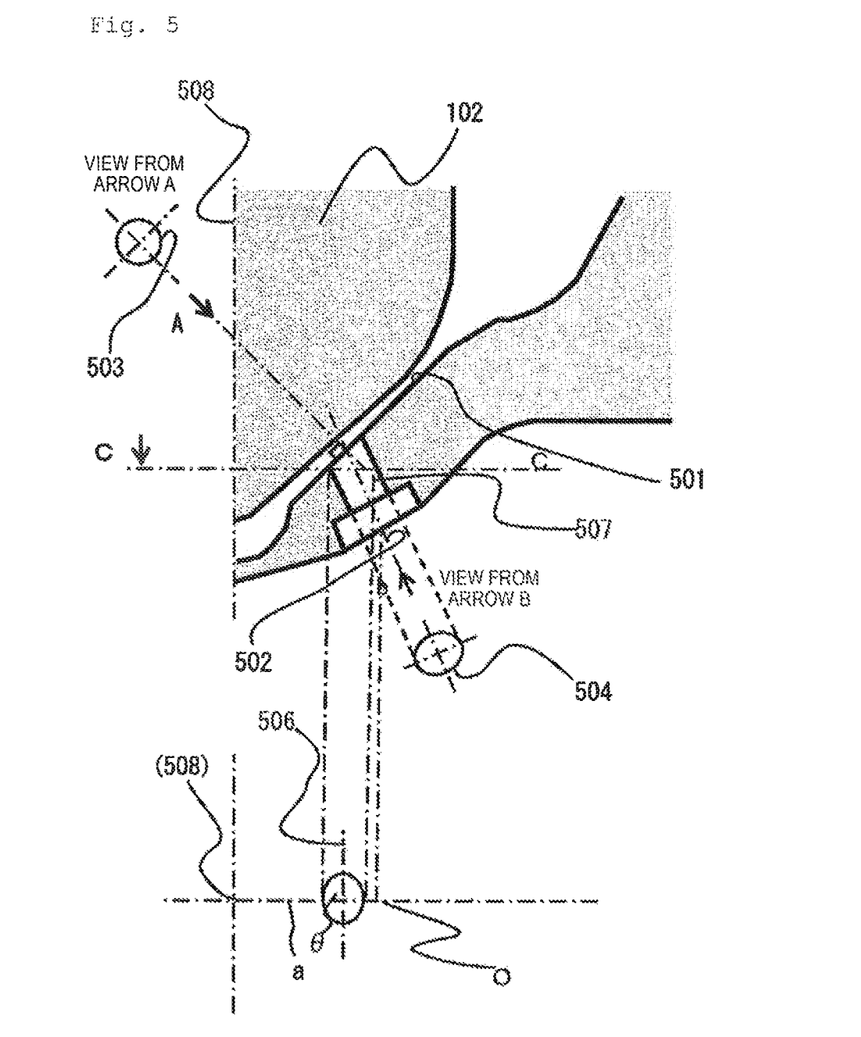
FIG. 5 is a schematic view illustrating a valve operation when an injection hole of the fuel injection valve according to the present invention employs an elliptical shape, and is a schematic view when the injection hole is viewed from an arrow c in a sectional view taken along line c-c.

Alternatively, a method of shortening the penetration while obtaining desired static flow includes a method of employing an elliptical shape for a cross section of an injection hole 507 as illustrated in FIG. 5. When the injection hole 507 having a sectional shape of a non-circular shape such as an ellipse is drilled, the sectional shape of the injection hole may be set so that at a point where a surface 501 having the injection hole 507 drilled thereon intersects an axis 502 of the injection hole, an area formed by an inlet shape 503 of the injection hole when viewed in a direction A perpendicular to the surface 501 is smaller than an area formed by an outlet shape 504 of the injection hole when the elliptical injection hole 507 is viewed in an axial direction b of the injection hole. If the sectional shape of the injection hole is set in this way, an inlet passage area formed, as a gap between the inlet portion of the injection hole and the valve body becomes smaller than an injection hole outlet area. The inlet shape 503 when the sectional shape of the injection hole is set to be the elliptical in this way is closer to a perfect circle than the outlet shape 504. That is, it is possible to obtain an advantageous effect of widening the sectional area from the injection hole inlet toward the injection hole outlet by drilling the elliptical injection hole in this way. Therefore, it becomes possible to obtain an advantageous effect of decelerating the flow toward the injection hole outlet inside the injection hole. According to this configuration, it is possible to suppress the flow velocity in the injection hole outlet portion, and thus it is possible to suppress the penetration.

In setting a major diameter and a minor diameter in the axial direction when the cross section of the injection hole is set to be elliptical, when an elliptical-shaped major axis is projected onto a surface which is perpendicular to an axial center 508 of the valve body, the projected major axis 506 may be deviated from the axial center 508 of the valve body (in FIG. 5, the projected major axis 506 is deviated from the axial center 508 of the valve body, and a deviation amount θ between a line segment a connecting an injection hole outlet center o and the axial center 508 of the valve body and the major axis 506 is 90°). Even when the flow velocity in the seat portion 201 is fast, it is possible to obtain desired flow velocity by employing the elliptical shape for the injection hole 507 in this way and by widening the sectional area in only a specific direction. In addition, the projected major axis is set to be deviated from the axial center 508. In this manner, it is possible to avoid a case where a direction of the longest portion within the sectional shape of the injection hole 507 coincides with a flowing direction from the seat portion 201. If the direction of the longest portion in the sectional shape coincides with the flowing direction from the seat portion 201, a greatly separated region is formed, and thus the sectional area of the injection hole cannot be effectively used, in some cases. However, if the longitudinal direction in the sectional shape of the injection hole is deviated from the flowing direction from the seat portion 201, it is possible to avoid the formation of the greatly separated region. The flow velocity component in the direction orthogonal to the injection hole axis within the cross section of the injection hole 507 is allowed to increase, thereby evenly maintaining the flow velocity distribution inside the injection hole 507. Accordingly, the flow velocity component in the spreading direction at the outlet of the injection hole 507 is allowed to increase.

As described above, according to the present invention, it is possible to shorten the penetration by increasing the flow velocity in the seat portion 201, and it is possible to obtain desired static flow by selecting a proper injection hole shape.

REFERENCE SIGNS LIST

101 VALVE SEAT
102 VALVE BODY
103 GUIDE MEMBER
104 CYLINDRICAL MEMBER
105 GUIDE MEMBER
106 MOVABLE ELEMENT
108 MAGNETIC CORE
109 COIL
110 BIASING SPRING

111 CONNECTOR
112 FUEL INLET
201 SEAT PORTION
202, 202a, 202b AXIS OF INJECTION HOLE
203 SEAT SURFACE
301a, 301b INNER WALL OF INJECTION HOLE
302a, 302b FLOW VELOCITY DISTRIBUTION
303a, 303b SEAT PORTION FLOW VELOCITY
401 INLET R
501 SEAT SURFACE
502 AXIS OF INJECTION HOLE
503 INLET SHAPE OF INJECTION HOLE
504 OUTLET SHAPE OF INJECTION HOLE
506 MAJOR DIAMETER SHAFT
507 INJECTION HOLE
503 AXIAL CENTER OF VALVE BODY

The invention claimed is:

1. A fuel injection valve comprising:
a valve seat that forms a gap with a valve body, the gap allowing fuel to pass therethrough; and
multiple injection holes that are located further downstream from the gap, wherein
fuel to which pressure is applied flows out from the injection holes,
the fuel injection valve is structured so as to cause a magnitude of a flow velocity of the fuel in the gap formed between the valve seat and the valve body to be greater than a magnitude of a value obtained by multiplying the square root of the pressure applied to the fuel by 28,
the injection hole is drilled so that a sectional shape thereof is an elliptical shape, and
at a position where an axis of the injection hole intersects a surface having the injection hole drilled thereon, a sectional area when an outlet shape of the injection hole is viewed in an axial direction of the injection hole is set to be larger than an area formed by an inlet shape of the injection.

2. The fuel injection valve according to claim 1, wherein an R-shape is disposed at an inlet of the injection hole so as to increase the flow velocity of the fuel in the gap.

3. The fuel injection valve according to claim 1, wherein a total sectional area of the injection hole is larger than a sectional area of a flow path in the gap.

4. A fuel injection valve comprising:
a valve seat that forms a gap with a valve body, the gap allowing fuel to pass therethrough; and
multiple injection holes that are located further downstream from the gap, wherein
fuel to which pressure is applied flows out from the injection holes,
a magnitude of a flow velocity of the fuel in the gap formed between the valve seat and the valve body is set to be greater than a magnitude of a value obtained by multiplying the square root of the pressure applied to the fuel by 28,
the injection hole is drilled so that a sectional shape thereof is an elliptical shape, and
at a position where an axis of the injection hole intersects a surface having the injection hole drilled thereon, a sectional area when an outlet shape of the injection hole is viewed in an axial direction of the injection hole is set to be larger than an area formed by an inlet shape of the injection hole when the injection hole is viewed in a direction perpendicular to the surface.

5. The fuel injection valve according to claim 4, wherein an R-shape is disposed at an inlet of the injection hole so as to increase the flow velocity of the fuel in the gap.

6. The fuel injection valve according to claim 4, wherein a total sectional area of the injection hole is larger than a sectional area of a flow path in the gap.

* * * * *